Nov. 3, 1953     G. M. WILLIAMS     2,658,015
PROTECTED WOOD STRUCTURE AND METHOD OF MAKING SAME
Filed Aug. 15, 1951
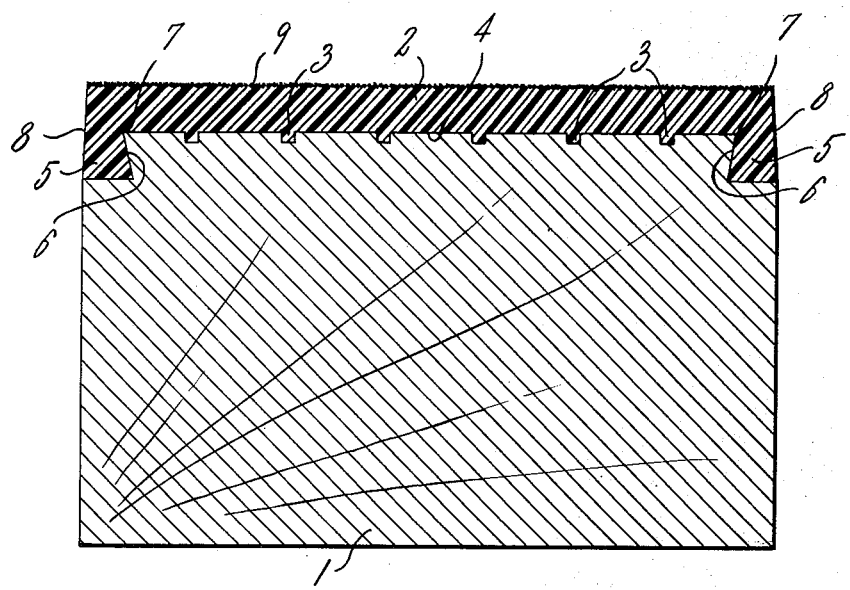
INVENTOR.
GEORGE M. WILLIAMS
BY
Robert J. Patterson
ATTORNEY Patented Nov. 3, 1953

2,658,015

UNITED STATES PATENT OFFICE 2,658,015

PROTECTED WOOD STRUCTURE AND
METHOD OF MAKING SAME

George M. Williams, New Haven, Ind., assignor
to United States Rubber Company, New York,
N. Y., a corporation of New Jersey Application August 15, 1951, Serial No. 242,015

2 Claims. (Cl. 154—132)

This invention relates to a wood structure which is protected against destructive influences such as mechanical shock, abrasion, blows, weather, high temperature, for example against flame, chemicals, water, for example salt water, etc., and to a method of making such a protective structure.

Solid wood structures, such as those made with planks, are widely used for flooring, for exposed parts of ships, especially for exposed decks of ships, for the flooring of docks, for railroad crossing planks, etc. However such wood structures have been subject to undesirably rapid disintegration and deterioration due to the action of mechanical influences including blows and abrasion, the action of weather, water, and chemical influences, the action of high temperature and particularly of fire and sparks, etc. Planks used in the decks of ships are particularly subject to such destructive influences. Thus ship decks are subject to splintering and the like as a result of the action of bullets and other missiles and as a result of the handling of cargo thereupon, while aircraft carrier deck planking is additionally subject to severe wear due to landing and take-off of airplanes, landing hook impact, landing cable whip and directly impinging flame from jet aircraft. Warping, checking, splintering and the like are very commonly encountered in the case of exposed wood structures, these being brought about chiefly by the action of water and weather.

In the case of railroad crossing planks, which are laid between the tracks and on both sides thereof, the service is extremely severe, necessitating frequent replacement of such planks, sometimes several times each year. The grinding action of vehicle wheels and tire chains, and the action of the weather cause very rapid deterioration of such planks.

My invention provides a simple, economical and highly effective solution to the problem of protecting wood structures against deterioration by influences of the types referred to above. The protection afforded by my invention completely overcomes the difficulties which are encountered when wood bodies, such as planks, boards or the like are exposed to the influences mentioned above.

The accompanying drawing portrays diagrammatically in vertical cross-section a wooden body which is protected in accordance with my invention and is highly suitable for use in the applications mentioned above and in similar applications.

I have discovered that a body of wood typified by a plank, a board, plywood, or the like can be protected effectively against the destructive influences mentioned above by adhering to a face thereof, under the action of heat and pressure, a continuous facing of a homogenous mixture of a cashew nut shell oil-modified phenol-formaldehyde resin capable of being cured under the action of a methylene-yielding hardening agent and heat, a rubbery butadiene-acrylonitrile copolymer and a filler, and effecting simultaneous curing of the mixture and adhesion thereof to the face of the wood under heat and pressure.

In practicing my invention I typically form into a sheet an uncured homogeneous mixture of a binder composed of the above-mentioned resin and rubbery copolymer and a hardening agent for the resin, and the filler. These ingredients are simply mixed together in any conventional manner well known in the plastic and rubber industries and formed into a sheet of suitable thickness for application of the body of wood to be protected in accordance with my invention. Typically, the uncured homogeneous mixture is sheeted by a calendering operation. The resulting sheet is then superimposed upon the face of the wooden body to be protected whereupon heat and pressure are applied thereto to cause simultaneous curing of the mixture, i. e. advancement of the phenolic resin to the insoluble infusible stage and probably also a curing of the rubber by the resin, shaping of the plastic sheet and firm adhesion of the plastic layer to the surface of the wooden body.

Instead of using a single pre-formed sheet of the uncured plastic, I can use any convenient number of super-imposed sheets of any suitable thickness. For example, when making a structure having a plastic face $3/8''$ thick, I can use a single sheet of uncured plastic which is approximately $3/8''$ thick or I can use three separate sheets of plastic stock each approximately $1/8''$ thick.

It will be obvious that where a plurality of sheets of uncured stock is used, the separate sheets are integrally welded into a unitary facing during the application of the heat and pressure to effect shaping, curing and adhesion of the plastic facing.

Instead of using sheeted stock, I can conceivably employ stock which is of granular form, although the difficulties of handling are much greater than is the case with sheeted stock.

In the curing and laminating operation, I prefer to employ pressures of the order of 85 to 125 pounds per square inch and temperatures ranging from 250° to 300° F. These pressures and temperatures can easily be attained by well-known techniques. After curing is complete, I prefer to maintain the pressure until the plastic has cooled down to as least 200° F. and preferably down to 150° F.

The degree of adhesion of the plastic facing to the wood base which is brought about by the present invention is remarkable. In fact the adhesive force with which the facing is bonded to the wood is greater than the cohesive strength of the wood itself so that if the facing is pulled away separation of wood from the wood base occurs. It was surprising to secure such a high degree of adhesion between plastic and wood without the use of any intermediate material and without the use of a volatile organic solvent.

The wood body which is protected by my invention is of substantial thickness, usually at least ½" and more commonly at least 1" in thickness.

In practicing my invention, I prefer to provide a plurality of spaced parallel grooves in the face of the wood to which the plastic is to be applied. I also prefer to provide deeper grooves or cuts at the two opposite edges of the face of the wood, these grooves preferably extending into the wood more deeply than the aforementioned grooves and preferably being undercut, i. e., of a cross section resembling half of a dovetail groove. Use of grooves of the type described is highly advantageous because during the molding and bonding operation, the plastic is forced into the grooves in a thermally expanded condition with the result that upon cooling the plastic shrinks to such an extent as to set up compressive stresses in the wood. These compressive forces keep the portion of the wood which is embraced by the plastic under compression during the life of the structure so that regardless of the exposure of the wood to moisture with consequent swelling or to drying-out conditions which would cause shrinkage, the portion of the wood next to the plastic is at all times maintained under compression whereby strong bonding of the plastic to the wood at all times is assured. Adhesion of the plastic to the wood maintained permanently under compression is far superior to adhesion of the plastic to wood under tension. By the use of the aforementioned grooves I insure that the wood adjacent the plastic is always under compression regardless of the conditions of moisture or drying out to which the wood structure of my invention is subjected.

In order to provide a non-slip surface, and perhaps to slightly further increase the wear-resistance of the surface, I prefer to sprinkle sand or other suitable powdered or granular abrasive substance, such as abrasive grits, upon the uppermost surface of the plastic prior to the molding, bonding and curing operation. When the assembly with such a layer of sand or like abrasive on its upper surface is subjected to heat and pressure to effect bonding and curing as described above, the particles of sand or the like are embedded partially in the surface of the cured plastic, thereby giving an excellent long-lasting non-slip surface.

Referring to the accompanying drawing, reference numeral 1 designates a body of wood the upper face of which is protected by a cured plastic facing 2 in accordance with the present invention. Wood body 1 can be formed of a single piece of wood or it can be built up from several pieces of wood in any suitable manner. Parallel grooves 3 are cut in the extreme upper face 4 of wood body 1 while two deeper half-dovetail grooves 5 are cut at each edge of the face 4 to be protected. Grooves 5 have side walls 6 which are undercut, i. e. they taper inwardly (as one passes from the facing 2 towards body 1) so as to give what might be termed "negative draft" whereby the cured plastic facing 2 is caused to shrink and compress the wood lying between walls 6 as the plastic cools following the molding and bonding operation. A plurality of sheets of the uncured mixture of the cashew nut shell oil-modified phenolic resin, resin hardening agent, butadiene-acrylonitrile rubbery copolymer and filler, of suitable thickness, are disposed above the grooved upper face 4 of the body 2. Typically these sheets are of such a width as to extend between the outer corners 7, of the grooved body 1. Heat and pressure are then applied in any suitable manner to the sheets of uncured plastic so as to force the same against the wooden body 1. The heat and pressure are of such magnitude as to cause the sheets of plastic to coalesce into an integral mass which is caused to extend downwardly at its edges so as to fill the half dovetail grooves 5 and the grooves 3, forming an assembly as shown in the drawing. The molding equipment used is so designed that the upper surface of the plastic facing 2 is shaped to a smooth flat surface while the sides 8 of the plastic facing 2 are simultaneously shaped under the heat and pressure applied during the bonding and curing operation. The sides 8 of the plastic cap are often shaped with a slight upward taper opposite to the taper of faces 6 of the half-dovetail grooves 5, as shown in the drawing to allow ready removal of the molding equipment from the assembly after a forming operation. After shaping, curing and bonding, the assembly is allowed to cool to room temperature whereupon shrinkage of the plastic facing 2 occurs with the resulting above-described compressive effect upon the upper portion of the wood body 1 which lies between faces 6 and 4.

If desired, particles 9 of abrasive are sprinkled on the uppermost face of the uncured plastic and are caused to be embedded in the surface during the forming operation.

As a result of the forming operation, the plastic facing 2 is caused to adhere with extreme tenacity to the upper portion of wood body 1. The degree of adhesion which is obtained, even at the relatively flat portions lying between grooves 3, is remarkable, being so great that if it is attempted to pull the plastic cap 2 away from the wood, failure of the wood occurs before failure of the bond between the plastic and the wood.

It was surprising to find that mere application of curing and shaping heat and pressure to the uncured plastic would effect such a remarkably high degree of adhesion of the plastic to the wood. It is noteworthy that my new results are achieved without the presence of a solvent in the plastic and without use of a volatile solvent or an adhesive cement. I have tried to form the protective facing by employing a solvent-based material containing the resin, rubbery copolymer, filler and an organic solvent but results were not satisfactory. Thus, I have attempted to form the plastic facing by brush-coating the wood with the solvent-based material followed by the application of curing heat but was unable to obtain the necessary continuity of facing or the necessary degree of adhesion. In addition the cost of the solvent and the hazards incidental to its use are avoided by my invention. I find the only way of getting satisfactory results is to place the solid uncured plastic stock over the face of the wood body and to apply heat and pressure thereto to bring about curing, shaping and bonding.

In practicing my invention, I almost invariably use the cashew nut shell oil-modified phenolic resin and the rubbery butadiene-acrylonitrile copolymer in relative proportions ranging from 30 to 70% by weight of said resin and correspondingly from 70 to 30% by weight of said rubbery copolymer, these percentages being based upon the sum of the weights of said resin and said rubbery copolymer. The proportion of filler almost invariably ranges from 30 to 55% by weight based on the sum of the resin and the rubbery copolymer.

Any cashew nut shell oil-modified phenolic resin made by reacting cashew nut shell oil (including its equivalent such as decarboxylated cashew nut shell oil) and a lower molecular weight phenol with formaldehyde and which is capable of being advanced to the insoluble, infusible stage upon being subjected to the action of heat while in intimate admixture with a methylene-yielding hardening substance, typified by hexamethylene-tetramine, can be employed in the practice of my invention. An example of such a resin is that known to the trade as Durez No. 12686. The resin may be available commercially with the methylene-yielding hardening agent already present, an example being the resin sold as Durez No. 12687 which is a mixture of 92 parts of the resin known as Durez No. 12686 and 8 parts of hexamethylene-tetramine.

The lower molecular weight phenol used in making the resin is either a monohydric or a polyhydric, preferably the former, monocyclic phenol containing no substituents on the ring other than hydrogen, hydroxyl groups and lower alkyl sidechains. Examples of such lower molecular weight phenols are phenol itself, and its homologues, such as the cresols, the xylenols, etc.

I prefer to employ the cashew nut shell oil in an amount ranging from 3 to 12 mole percent based on the sum of the moles of the cashew nut shell oil and the lower molecular weight phenol.

Ordinary phenol is the preferred phenol for making the resin. As ordinary phenol is replaced by cresol there is a tendency for the resin obtained to become softer.

The resin is typically made by heating a mixture of the lower molecular weight phenol, the cashew nut shell oil (either as such or in the decarboxylated form) and formaldehyde, in the presence of a suitable catalyst, usually an inorganic acid, e. g. sulfuric or hydrochloric acid, until an oil-soluble resin is produced. During the final portion of the reaction, the resin is advanced to the desired stage at which it is still soluble and fusible but convertible to insoluble, infusible form by the combined action of heat and the hardening agent.

Any rubbery copolymer of butadiene and acrylonitrile which is compatible with the cashew nut shell oil-modified resin can be used. The rubbery butadiene-acrylonitrile copolymer will typically contain from 15 to 45% by weight of combined acrylonitrile. Those rubbery copolymers which contain 35 to 45% acrylonitrile are particularly suitable because they are completely compatible or miscible in all proportions with the cashew nut shell oil-modified phenolic resin.

The filler used in the plastic facing can be wood flour, silica (such as sand or diatomaceous earth), carbon black, clay, asbestos fibers, or cellulose fibers.

The composition from which the plastic facing of my invention is made contains a methylene-yielding hardening agent, preferably hexamethylenetetramine or its known equivalents, in amount sufficient to advance the phenolic resin to the hard, infusible, insoluble condition during the curing, shaping and bonding operation. Usually the amount of the hardening agent will range from 5 to 10% by weight based on the phenolic resin.

The plastic composition may also contain small amounts of other suitable materials such as mold lubricants, pigments and coloring agents to give any desired color, anti-oxidants for the rubber, etc. If desired, vulcanizing agents such as sulfur, and other vulcanizing ingredients, such as the usual vulcanization accelerators, may also be present but they are not necessary and in some cases it is believed that slightly better results are obtained when they are omitted.

The phenolic resin, rubbery copolymer, filler and hardening agent are brought together in any suitable manner, as by milling on a rubber mill or in a Banbury, to form a uniform homogeneous mixture. The mixture is then sheeted out, as on a rubber calender or otherwise, to form sheets of any suitable thickness.

The uncured plastic mixture cures very rapidly so that the productivity of the forming (molding, curing and bonding) equipment is high. Under the action of the heat and pressure during the curing, shaping and bonding operation, the plastic material flows in such a way as to form a solid uniform integral molded plastic face in which the phenolic resin has been converted to insoluble, infusible condition. It is believed that the resin and the rubbery copolymer exert a mutual co-curing action upon one another during the curing and bonding operation but the nature of any such co-curring effect is not understood and I do not wish to be limited by any theory. In any event the resin appears to cure the rubbery copolymer in some manner, since sulfur and similar curatives for the rubbery copolymer are wholly unnecessary whereas they would be necessary to cure the rubbery copolymer by itself.

The principles of my invention can be employed to protect an existing wood structure by simply laminating thereto a facing of the plastic composition under heat and pressure in accordance with the above disclosure. For example the plastic facing of my invention can be applied to the deck planking of an existing ship. More commonly my invention will be applied to wooden structures, e. g., planks or the like, which are thereafter installed where they are to be used.

While the principal application of my invention will be for the protection of exposed ship planking, especially deck planks or other wooden structures of a ship, I can employ structures of my invention for any flooring or like application where extremely severe service conditions are encountered as for railroad crossing planks, dock planks, industrial flooring, stair treads, etc.

The thickness of the protective plastic facing of my invention can vary within wide limits. In the case of a water-cooled ship deck I can obtain good results with a facing which is only 0.015″ in thickness. For other applications, such as railroad crossing planks, industrial flooring, etc., I prefer that the facing be at least ⅛″ in thickness. For dock planking, ordinary ship decking, and similar applications I prefer a facing at least ⅜″ thick.

*Example*

Wood planking for ship decks was constructed using the procedure described above and using a plastic composition having the following formulation:

| | Parts by weight |
|---|---|
| Durez 12687 | 26.96 |
| Hycar OR-15 (rubbery butadiene-acrylonitrile copolymer) | 41.67 |
| Dicalite L-1 (diatomaceous earth) | 29.41 |
| Anti-oxidant (for rubber) | 0.49 |
| Mold Lubricant | 0.49 |
| Carnauba wax | 0.98 |

These ingredients were mixed and sheeted out. A plurality of the resulting sheets were placed upon a piece of wood which had been grooved on its upper face as shown in the drawing whereupon a pressure of 100 pounds per square inch was applied and the plastic sheets were heated to 300° F. The heat was applied for 15 minutes whereupon the assembly was allowed to cool to room temperature, the pressure being maintained throughout the heating and cooling steps. The protective plastic facing was ⅜" thick, this being the distance from upper wood face 4 to the upper face of the cured plastic layer. The resulting assembly had all of the advantages described above.

Although, in a specific embodiment described herein, I have shown application of my plastic facing across the upper face of only one body of wood, it will be understood by those skilled in the art that if desired I can provide a plurality of wooden bodies, for example, boards or plywood, disposed side by side and apply the uncured plastic material across such a plurality of wooden bodies. During the application of the curing, shaping and bonding heat and pressure a continuous protective facing of cured plastic is formed across the faces of the wooden bodies and across the joints therebetween.

From the foregoing description, numerous advantages of the present invention will be apparent to those skilled in the art. Some of these advantages will now be enumerated. The impact-resistance of the structure of my invention is remarkable. The structure of my invention will withstand blows which could completely shatter unprotected wood structures. My invention provides a structure which is exceedingly strong, which is free from splintering when struck by bullets or other missiles or when struck by the hooks used in aircraft carrier landings. The degree of adhesion of the plastic facing of my invention is unusual. The structure of my invention is far superior to wood alone for resisting weather and water, especially salt water. It is highly resistant to chemical destruction. It is very resistant to high temperatures, for example, those temperatures which are the result of the impinging action of the jets of jet aircraft on the decks of aircraft carriers. The flame-resistance of the protected structure of my invention is particularly good if provision is made for the circulation of water as a coolant through the body of protected wood.

Although my invention has been described with particular reference to its use in flooring, decking and the like, it will be understood that my invention is not limited to such use but can be used wherever the advantageous properties of my protected wood structure are desired.

Having thus described my invention, what I claim and desire to protect by Letters Patent is:

1. As a new article of manufacture, a body of wood having secured directly to a face thereof a continuous protective facing comprising a heat-cured homogeneous mixture of a cashew nut shell oil-modified lower molecular weight phenol-formaldehyde resin, which is soluble and fusible but convertible to insoluble, infusible form by the action of heat and a methylene-yielding hardening agent, a methylene-yielding hardening agent for said resin in amount sufficient to advance the same to insoluble, infusible form, a rubbery butadiene-acrylonitrile copolymer compatible with said resin, and diatomaceous earth as a filler, said resin and said copolymer being present in proportions of from 30 to 70% by weight of said resin and correspondingly from 70 to 30% by weight of said copolymer, said percentages being based on the sum of said resin and said copolymer; said diatomaceous earth being present in a proportion of from 30 to 55% by weight based on the sum of said resin and said copolymer, said facing being of substantial thickness and being directly and tenaciously adhered to said face by curing in situ under heat and pressure a solvent-free solid mixture consisting essentially of said ingredients.

2. A method of protecting a body of wood against destructive influences which comprises placing directly in contact with a face of said body of wood which is to be protected an uncured solvent-free solid mixture consisting essentially of a cashew nut shell oil-modified lower molecular weight phenol-formaldehyde resin which is soluble and fusible but convertible to insoluble, infusible form by the action of heat and a methylene-yielding hardening agent, a methylene-yielding hardening agent for said resin in amount sufficient to advance the same to insoluble, infusible form, a rubbery butadiene-acrylonitrile copolymer compatible with said resin, and diatomaceous earth, said resin and said copolymer being present in proportions of from 30 to 70% by weight of said resin and correspondingly from 70 to 30% by weight of said copolymer, said percentages being based on the sum of said resin and said copolymer; said diatomaceous earth being present in a proportion of from 30 to 55% by weight based on the sum of said resin and said copolymer, and pressing said mixture directly against said face while subjecting said mixture to heat, the degree of pressure and heat being such as to convert said mixture to a continuous facing, cure said mixture and effect tenacious adhesion thereof to said face.

GEORGE M. WILLIAMS.

References Cited in the file of this patent

UNITED STATES PATENTS

| Number | Name | Date |
|---|---|---|
| 820,221 | Lindley | May 8, 1906 |
| 1,531,983 | Sawyer | Mar. 31, 1925 |
| 2,275,989 | Perry | Mar. 10, 1942 |
| 2,376,854 | Saunders et al. | May 22, 1945 |
| 2,394,478 | Prentice | Feb. 5, 1946 |
| 2,398,890 | Howard | Apr. 23, 1946 |
| 2,459,739 | Groten et al. | Jan. 18, 1949 |
| 2,473,319 | Winkelmann | June 14, 1949 |
| 2,532,374 | Shepard et al. | Dec. 5, 1950 |

OTHER REFERENCES

"Thermosetting Rubber-Resin Compounds," article by Shepard et al., published in "Modern Plastics" for Oct. 1946, pp. 154–156, 210 and 212.

"Fillers for Plastics," article by E. E. Halls, published in British "Plastics" for Oct. 1942, pp. 353 and 354.

"Fillers for Plastics," article by E. E. Halls, published in British "Plastics," Aug. 1942, p. 267.